(12) United States Patent
Igari

(10) Patent No.: US 8,819,543 B2
(45) Date of Patent: Aug. 26, 2014

(54) IMAGE PROCESSING APPARATUS, IMAGE PROCESSING METHOD, AND STORAGE MEDIUM

(75) Inventor: Toshinori Igari, Fuchu (JP)

(73) Assignee: Canon Kabushiki Kaisha, Tokyo (JP)

(*) Notice: Subject to any disclaimer, the term of this patent is extended or adjusted under 35 U.S.C. 154(b) by 222 days.

(21) Appl. No.: 12/903,170

(22) Filed: Oct. 12, 2010

(65) Prior Publication Data

US 2011/0029859 A1 Feb. 3, 2011

Related U.S. Application Data

(63) Continuation of application No. PCT/JP2010/059673, filed on Jun. 8, 2010.

(30) Foreign Application Priority Data

Jun. 9, 2009 (JP) .................................. 2009-138400

(51) Int. Cl.
  *G06F 17/00* (2006.01)
  *G06F 17/21* (2006.01)
(52) U.S. Cl.
  CPC ..................................... *G06F 17/217* (2013.01)
  USPC ............ 715/243; 715/854; 345/411; 345/468
(58) Field of Classification Search
  CPC .................................................... G06F 17/217
  USPC ............................ 715/234, 243; 345/411, 468
  See application file for complete search history.

(56) References Cited

U.S. PATENT DOCUMENTS

| | | | | |
|---|---|---|---|---|
| 6,388,765 B1* | 5/2002 | Nagano et al. | ............... | 358/1.18 |
| 7,185,278 B1* | 2/2007 | Simmons | ....................... | 715/235 |
| 7,188,309 B2* | 3/2007 | Simmons et al. | ............. | 715/244 |
| 7,246,306 B2* | 7/2007 | Chen et al. | ..................... | 715/205 |
| 7,355,742 B2* | 4/2008 | Okamura | ..................... | 358/1.18 |
| 7,461,332 B2* | 12/2008 | Brintzenhofe et al. | ....... | 715/205 |
| 8,127,221 B2* | 2/2012 | Vaschillo et al. | ............. | 715/209 |
| 8,332,750 B2* | 12/2012 | Banyasad et al. | ............. | 715/251 |
| 2003/0182629 A1* | 9/2003 | Okamura | ..................... | 715/525 |
| 2004/0205513 A1* | 10/2004 | Chen et al. | ................. | 715/501.1 |
| 2005/0034068 A1* | 2/2005 | Jaeger | ........................... | 715/517 |
| 2005/0094208 A1* | 5/2005 | Mori | ............................. | 358/1.18 |

(Continued)

FOREIGN PATENT DOCUMENTS

| | | | |
|---|---|---|---|
| JP | 60-164874 A | | 8/1985 |
| JP | 08-161517 A | | 6/1996 |

(Continued)

*Primary Examiner* — William Bashore
*Assistant Examiner* — Nathan Shrewsbury
(74) *Attorney, Agent, or Firm* — Canon U.S.A., Inc. IP Division

(57) ABSTRACT

An object including at least one element is moved on a document in which the object is arranged in response to an instruction from a user.

In addition, if the object is moved to a boundary between two pages, at least one element that is included in the object and that corresponds to a break position of the two pages is detected.

Then, a position where the at least one detected element is arranged in the document is determined so that the element is arranged in either of the documents of the two pages and an image corresponding to the document is output.

In the above manner, it is possible to appropriately arranging elements in a document to output an image corresponding to the document having the elements appropriately arranged therein.

21 Claims, 21 Drawing Sheets

(56) References Cited

U.S. PATENT DOCUMENTS

| | | | |
|---|---|---|---|
| 2006/0150093 A1* | 7/2006 | Chen | 715/518 |
| 2006/0197999 A1* | 9/2006 | Murakami | 358/538 |
| 2006/0280373 A1 | 12/2006 | Uchida | |
| 2008/0089612 A1* | 4/2008 | Isomura | 382/295 |
| 2009/0195553 A1* | 8/2009 | Mathew et al. | 345/619 |
| 2009/0199088 A1* | 8/2009 | Haug et al. | 715/244 |
| 2010/0153841 A1* | 6/2010 | Haug et al. | 715/244 |
| 2010/0318942 A1* | 12/2010 | Banyasad et al. | 715/854 |

FOREIGN PATENT DOCUMENTS

| | | |
|---|---|---|
| JP | 2000-316131 A | 11/2000 |
| JP | 2004-175095 A | 6/2004 |
| JP | 2006-048531 A | 2/2006 |
| JP | 2006-252122 A | 9/2006 |
| JP | 2007-012030 A | 1/2007 |
| JP | 2007-017945 A | 1/2007 |
| JP | 2008-269108 A | 11/2008 |

* cited by examiner

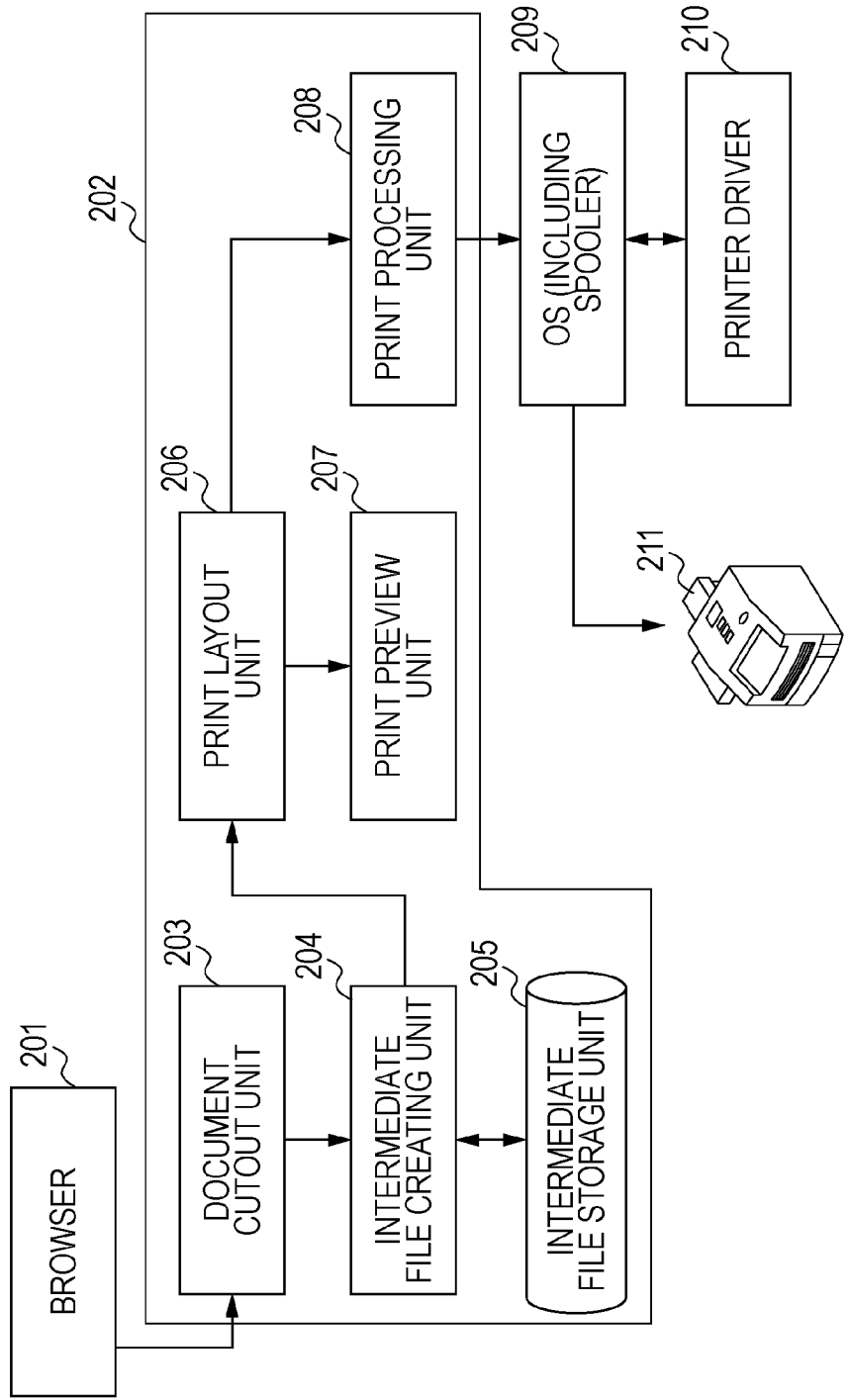

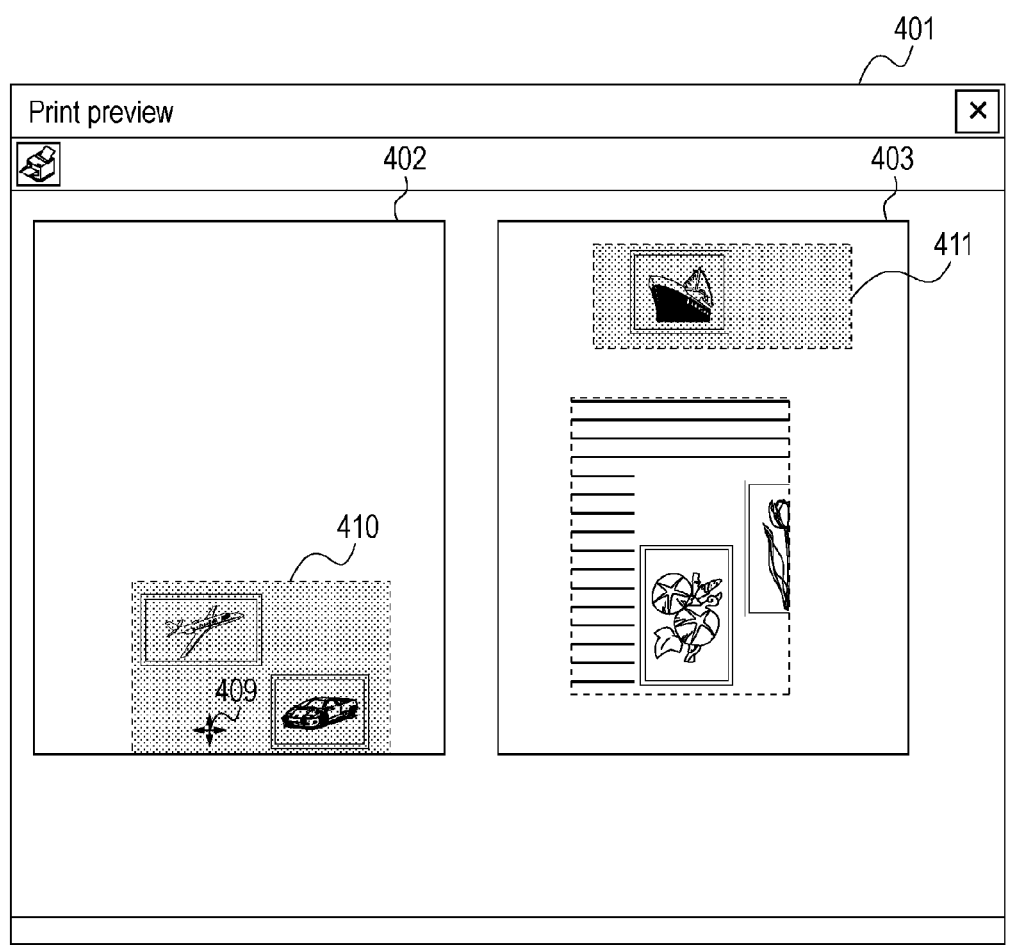

ial Appli-
IMAGE PROCESSING APPARATUS, IMAGE PROCESSING METHOD, AND STORAGE MEDIUM

CROSS-REFERENCE TO RELATED APPLICATIONS

This application is a Continuation of International Application No. PCT/JP2010/059673, filed Jun. 8, 2010, which claims the benefit of Japanese Patent Application No. 2009-138400, filed Jun. 9, 2009, both of which are hereby incorporated by reference herein in their entirety.

TECHNICAL FIELD

The present invention relates to an image processing apparatus outputting an image corresponding to a document having elements arranged therein.

BACKGROUND ART

Systems editing the print layouts of images including texts, images, graphics, and so on are known. Such systems are used in, for example, document editing software, drawing software, and album software for creating albums with images captured by digital cameras.

In such a system, a user can generally operate a pointing device, such as a mouse, to move, enlarge, or contract a graphic object in an image. There are cases in which the object that is moved or enlarged is across the boundary of the page when layout of the object is performed in the page. Part of the drawing software creating drawings or graphics is capable of editing an object across pages.

For example, with album software that performs the layout of images in facing pages, an image can be arranged on the fold line of the facing pages. Patent Document 1 describes a technique to shift an image of, for example, a person from the fold line of facing pages so that an area corresponding to the person or the like in the image is not arranged on the fold line of the pages when the layout of the image is performed in a layout frame that is set in advance on the facing pages.

In addition, a document editing application that arranges a table across pages is also known.

CITATION LIST

Patent Literature

PTL 1: Japanese Patent Laid-Open No. 2007-012030

With the technique described in Patent Document 1, the layout of the image is performed in the layout frame that is set in advance on the facing pages. Accordingly, the user does not arbitrarily perform editing, for example, enlargement or movement of the image and does not perform the layout of the image subjected to the editing.

In other words, it is not possible for the user to arbitrarily move or enlarge the image.

In contrast, there are cases in which an object is arranged at a break position of a page as the result of arbitrary editing of the object in the page by the user. When the object is divided at the break position of the page in the above cases, it can become difficult for the user to recognize the content of the objects resulting from the division.

In addition, in the document editing application arranging a table across pages, the lines in the table are considered to be similar to the lines in a text and line feed is performed among the pages. The line feed among pages in the document editing application will now be described with reference to FIG. 12A and FIG. 12B. As shown in FIG. 12A, when a page 1201 is filled with characters to the trailing end thereof, the line feed is performed to fill a page 1202 next to the page 1201 with characters from the leading end thereof. Similarly, as shown in FIG. 12B, also in pages 1203 and 1204 that are not continuously vertically arranged, line feed 1205 is performed from the trailing end of the page 1203 to the leading end of the page 1204. When a table is arranged across the pages, the line feed is performed to the lines in the table to divide the table, as in the line feed of the text shown in FIG. 12A and FIG. 12B.

Accordingly, even when the user wants to view the entire table, it can become difficult for the user to recognize the content of the table because the table is divided among the pages.

The present invention provides an image processing apparatus capable of appropriately arranging elements in a document to output an image corresponding to the document having the elements appropriately arranged therein.

SUMMARY OF INVENTION

The present invention provides an image processing apparatus characterized by including a moving unit configured to move an object including at least one element in a document in which the object is arranged in response to an instruction from a user; an acquiring unit configured to acquire information indicating the position in the document of an element included in the object moved on the document by the moving unit; a detecting unit configured to, if the object is moved to a boundary between two pages by the moving unit, detect at least one element that is included in the object and that corresponds to a break position of the two pages on the basis of the information acquired by the acquiring unit; a determining unit configured to determine a position where the at least one element detected by the detecting unit is arranged in the document so that the element is arranged in either of the two pages; and an output unit configured to output an image corresponding to the document in which the element is arranged at the position determined by the determining unit.

Further features of the present invention will become apparent from the following description of exemplary embodiments with reference to the attached drawings.

BRIEF DESCRIPTION OF DRAWINGS

FIG. 2 is a block diagram showing the configuration of software on a PC 101.

FIG. 4C is another diagram showing the print preview screen.

DESCRIPTION OF EMBODIMENTS

Preferred embodiments of the present invention will herein be described in detail with reference to the attached drawings. It is to be understood that the embodiments described below do not limit the present invention according to the following claims and that all the combinations of features described in the embodiments are not necessarily essential to resolving means of the present invention.

Figure 1:
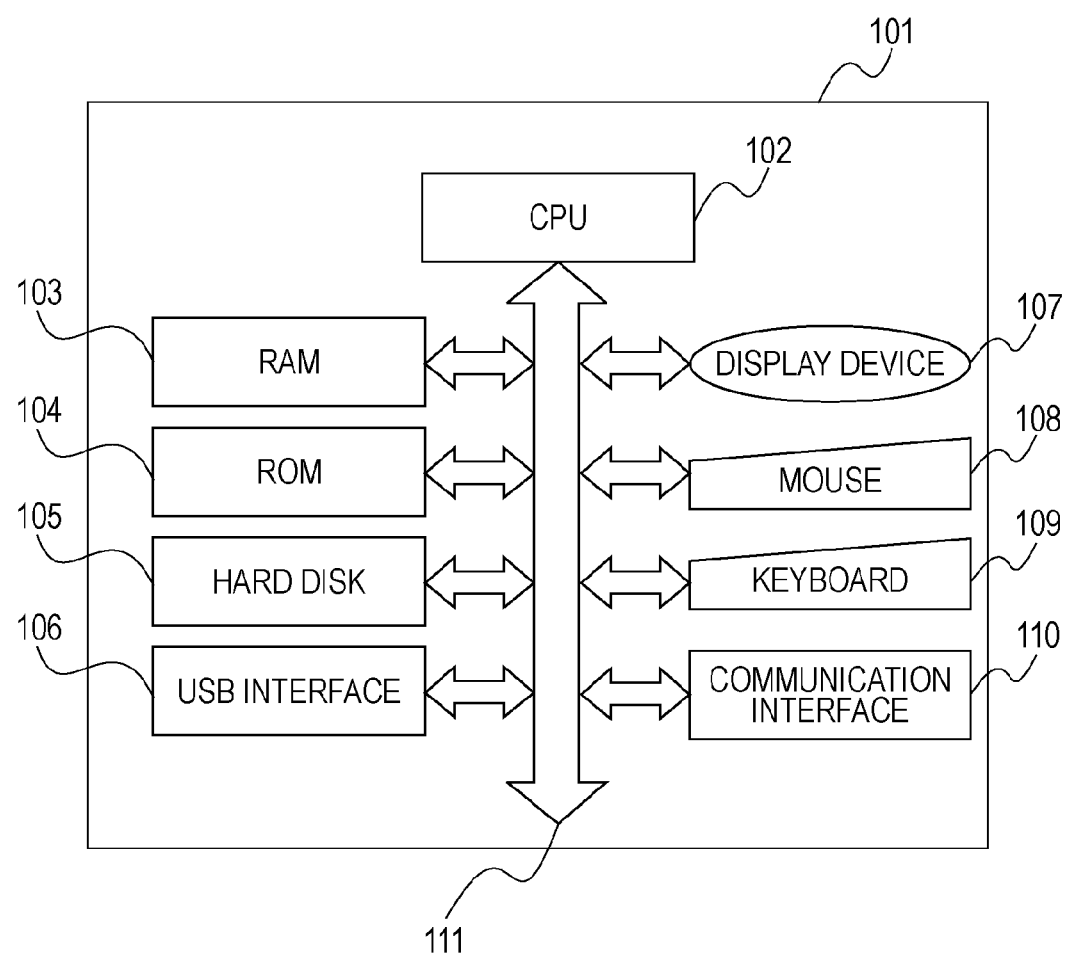
FIG. 1 is a block diagram showing the configuration of a layout editing apparatus.

FIG. 1 is a block diagram showing the configuration of a layout editing apparatus. Reference numeral 101 denotes a personal computer (PC), which is an example of the layout editing apparatus.

A central processing unit (CPU) 102 performs calculation of data and/or executes instructions in accordance with programs to control each part in the PC 101 and an apparatus connected to the layout editing apparatus. A random access memory (RAM) 103 is a memory used as a temporary storage area. A read only memory (ROM) 104 is a memory that stores various programs executed by the CPU 102. A hard disk 105 records programs and data for an operating system (OS), a browser, and other application software. Specifically, the CPU 102 reads out the programs stored in the ROM 104 or the hard disk 105 into the RAM 103 and executes the programs by using the RAM 103 as a working memory to perform a variety of control.

A USB interface 106 is connected to a universal serial bus (USB) cable and performs data communication with a printer (not shown) through the USB cable. The communication with the printer may be performed, for example, through a small computer system interface (SCSI) or wirelessly, instead of through the USB cable.

A display device 107 includes a cathode ray tube (CRT) or a liquid crystal display and a graphic controller. The display device 107 performs a variety of display under the display control of the PC 101. The display device 107 displays, for example, a Web page based on a structured document downloaded from a Web server through a communication interface 110, a print preview image, or a graphic user interface (GUI).

A mouse 108 and a keyboard 109 are input devices that are used by a user to issue various instructions to the PC 101. Data is exchanged among the CPU 102, the RAM 103, the ROM 104, the hard disk 105, and so on through a system bus 111.

The communication interface 110 is connected to a local area network (LAN) cable. The communication interface 110 is used for data communication with an external Web server through a router (not shown) or over the Internet. The data communication may be performed wirelessly with, for example, an interface supporting the wireless communication.

FIG. 2 is a block diagram showing the configuration of software on the PC 101. Programs operating on the PC 101 and the data processing configuration of the programs will now be described with reference to FIG. 2.

Referring to FIG. 2, a browser 201 is an application to display a Web page. The browser 201 downloads a structured document file on a Web server (not shown) into the hard disk 105 in the PC 101. The browser 201 displays a Web page in the display device 107 on the basis of the structured document file. The structured document file is described in a structure language, such as Hypertext Markup Language (HTML) or Extensible HTML (XHTML). Specifically, elements, such as texts and images, which compose a structured document are described by using tags in the structured document file. In addition, another file called a cascading style sheet (hereinafter referred to as CSS), which specifies the display style of theses elements, is specified in the structured document. The browser 201 analyzes the structured document files to display a Web page in the display device 107.

FIG. 2 is a block diagram showing the software configuration on the PC 101. Each block shown in FIG. 2 results from classification of the programs stored in the ROM 104 and the hard disk 105 for every function and the programs are executed by the CPU 102. Referring to FIG. 2, a structured document printing module 202 is plug-in software called from the browser 201. The structured document printing module 202 is executed when the user issues a printing instruction or a print preview instruction to the browser 201.

A document cutout unit 203 cuts out part of the structured document. Specifically, the document cutout unit 203 cuts out a print area that is determined on a Web page displayed by the browser 201 by the user with the pointing device, such as the mouse. An intermediate file creating unit 204 creates an intermediate file in, for example, an Enhanced Metafile (EMF) format corresponding to the print area cut out by the document cutout unit 203 as a graphic object. The intermediate file is stored in an intermediate file storage unit 205. In the intermediate file, the elements, such as texts or images, on the Web page are held as vector data. Accordingly, it is possible to suppress a reduction in image quality when an object displayed on the basis of the intermediate file is subjected to editing, such as enlargement, compared with a case in which image data, such as bitmap data, is edited.

A print layout unit 206 performs layout of the graphic object, which is the intermediate file, on a sheet in accordance with print settings. The print settings include information about the sheet size, the resolution, a printable area, etc. and are acquired from a printer driver 210 through an OS 209.

A print preview unit 207 displays the graphic object subjected to the layout in the print layout unit 206 in the display device 107 as a print preview. A print processing unit 208 performs a drawing process to the printer driver 210 via the OS 209 in response to an instruction to start the printing from the user. The drawing process is performed on the basis of the object, which is the intermediate file, arranged in accordance with the information indicating the layout performed by the print layout unit 206.

The OS 209 provides an application program interface (API) used by the structured document printing module 202 that receives print setting data from the printer driver 210 and an API to perform the drawing process. Although the OS 209 includes a variety of control software, such as a spooler system that manages a print job and a port monitor that outputs a printer command to a port, a detailed description of such software is omitted herein. The printer driver 210 generates print data in accordance with the drawing process performed by the print processing unit 208. The printer driver 210 converts the generated print data into a printer command and transmits the printer command to a printer 211 through the OS 209 to cause the printer 211 to print an image on a sheet.

Figure 3A:
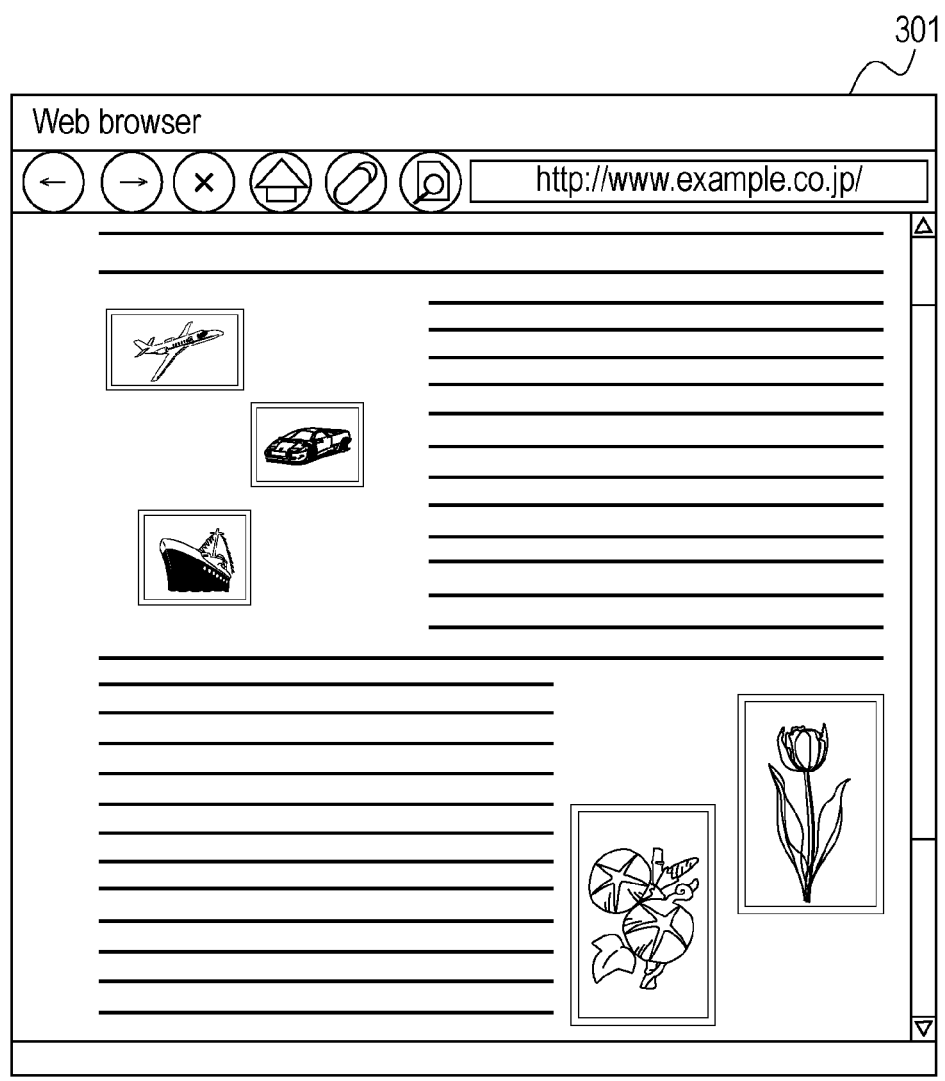
FIG. 3A is a diagram showing a GUI screen.
Figure 3B:
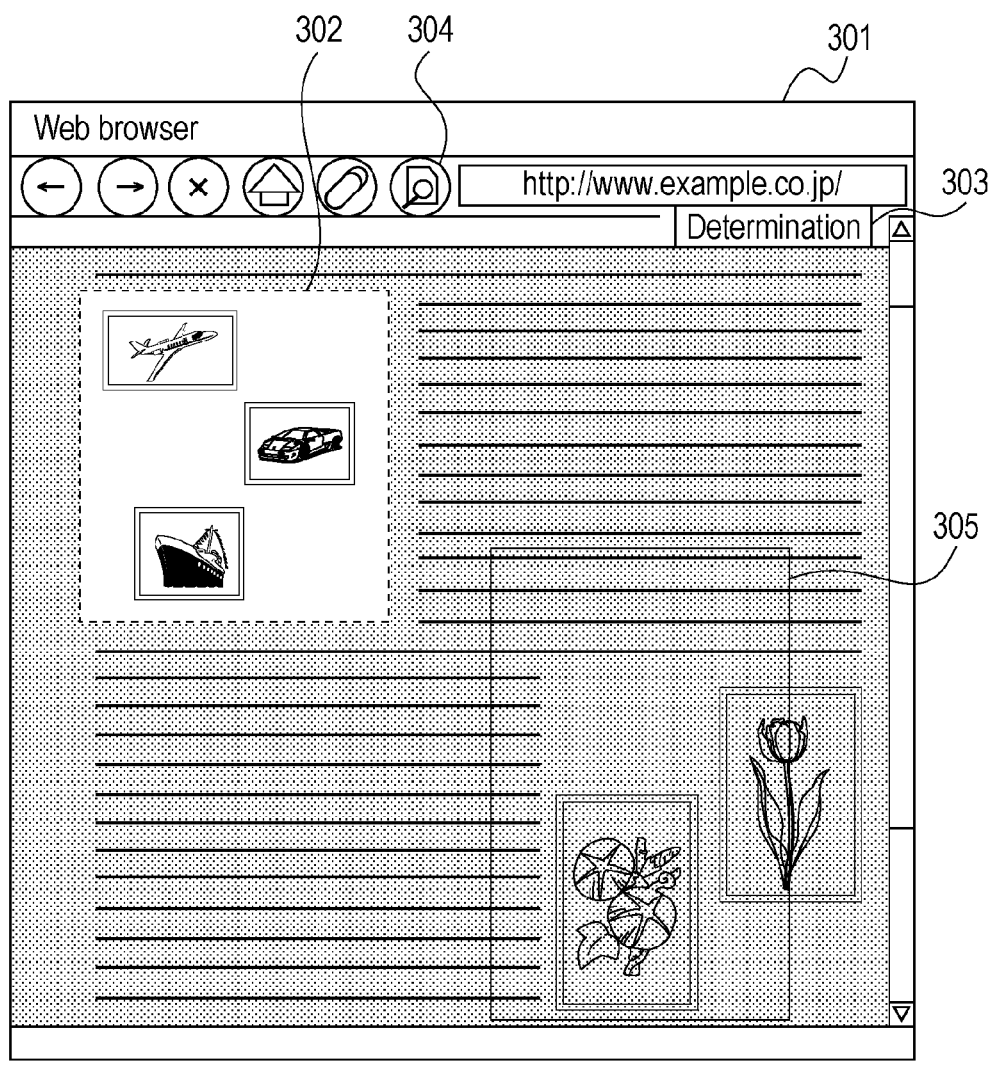
FIG. 3B is a diagram showing another GUI screen.

Next, GUI screens displayed by the processing in the document cutout unit 203 will be described. FIG. 3A and FIG. 3B are diagrams showing GUI screens.

A Web page is displayed in a browser 301. Upon pressing of a clip button by the user, the browser 301 enters a clip mode, as shown in FIG. 3B, and the Web page is overlapped with a gray window. When the user performs a drag operation to specify an area where the user wants to perform the printing, a selection area 302 is cut out by the processing in the document cutout unit 203 and the selected area is changed to a normal display mode in which the Web page is not overlapped with the gray window. The selection area 302 can be moved, enlarged, or contracted in this state.

After the area where the user wants to perform the printing is determined, the user presses a Determination button 303 to terminate the clip mode. The selection area 302 in the Web page is converted into an EMF file by the intermediate file creating unit 204 and the EMF file is stored in the intermediate file storage unit 205. Upon pressing of a Print preview button 304 shown in FIG. 3B by the user, a print preview screen is displayed by the processing in the print preview unit 207.

Figure 12A:
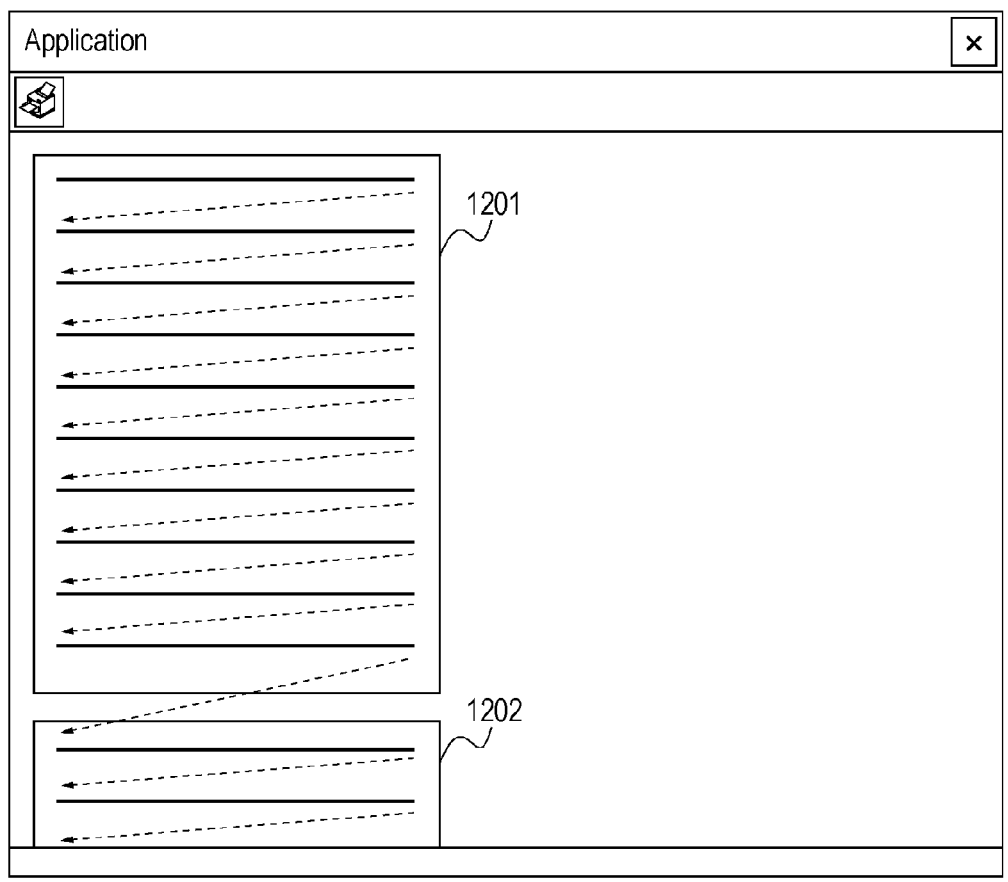
FIG. 12A is a diagram for description of line feed between pages in a document editing application.
Figure 12B:
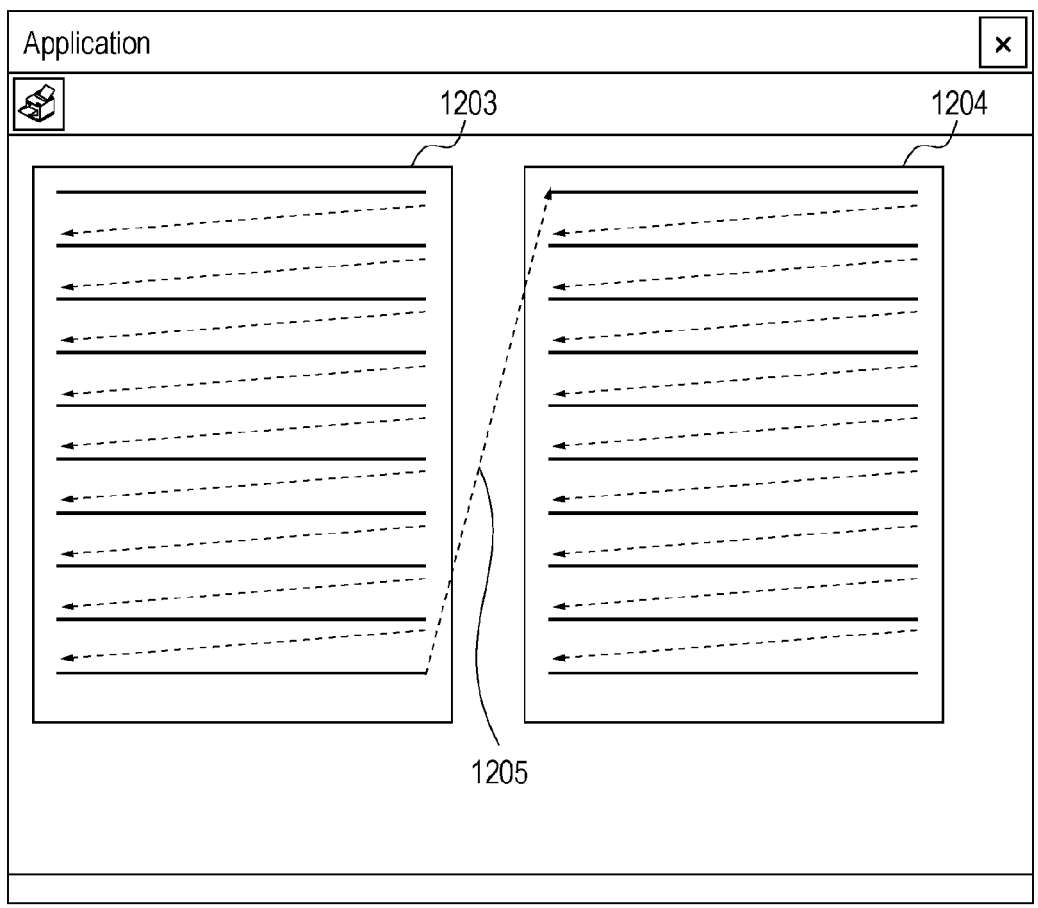
FIG. 12B is another diagram for description of the line feed between pages in the document editing application.

FIG. 4A, FIG. 4B, FIG. 4C, and FIG. 4D are diagrams showing a print preview screen. In a print preview screen 401, as in the example in FIG. 12B, pages 402 and 403 are displayed so as not to be continuously arranged but so as to be horizontally arranged. An object 404 is an intermediate file in the EMF format created on the basis of the selection area 302 in the Web page and an object 405 is an intermediate file in the EMF format created on the basis of a selection area 305 in the Web page. Multiple areas may be selected from the same page or multiple areas may be selected from multiple Web pages.

Figure 4A:
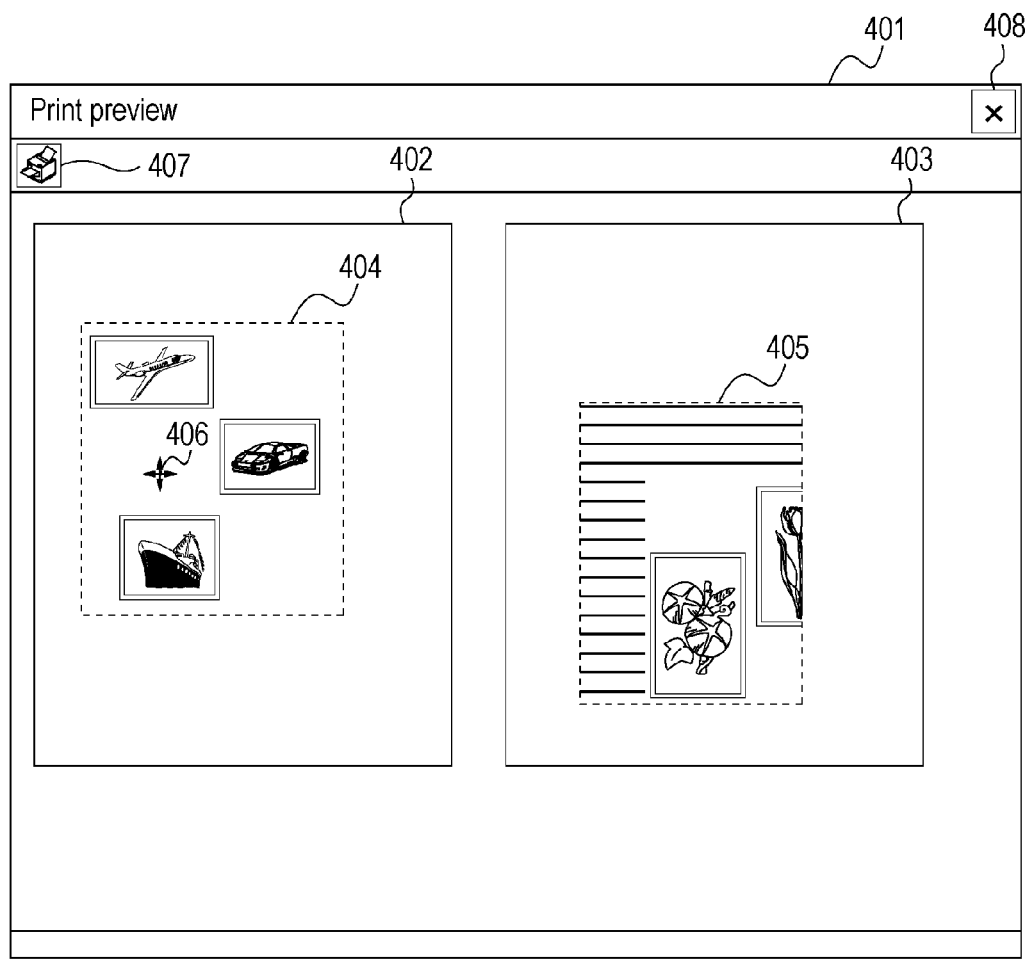
FIG. 4A is a diagram showing a print preview screen.

Such an object can be divided among the pages to display the objects resulting from the division by the processing in the print layout unit 206. A case in which the object 404 is specified with a mouse pointer 406 to move the object 404 downward in FIG. 4A is exemplified here.

Figure 4B:
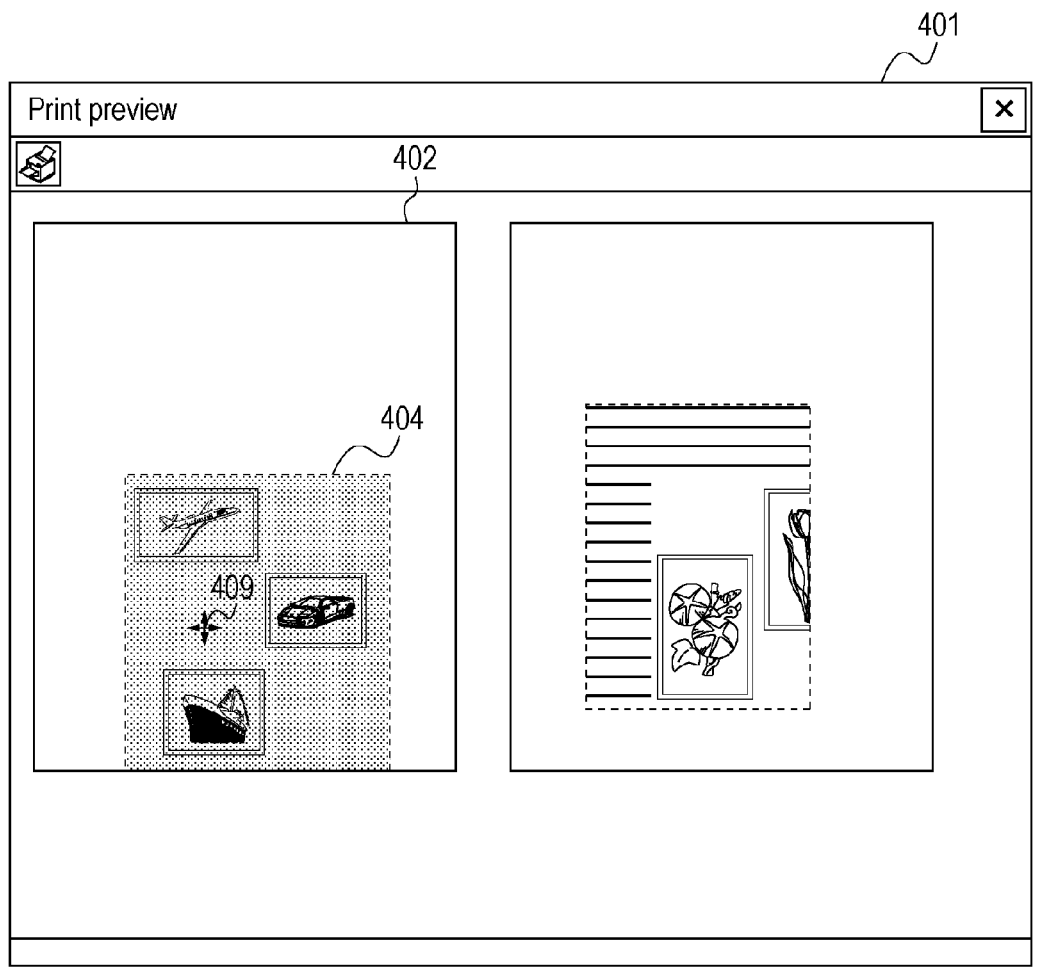
FIG. 4B is another diagram showing the print preview screen.

FIG. 4B is a diagram showing the object 404 that is being moved. The object 404 that is being moved is displayed in, for example, a half-tone shaded state so that the object that is being moved can be identified. The half-tone shaded state is returned to the normal state when the editing operation is determined by the mouse button that is released.

Figure 4D:
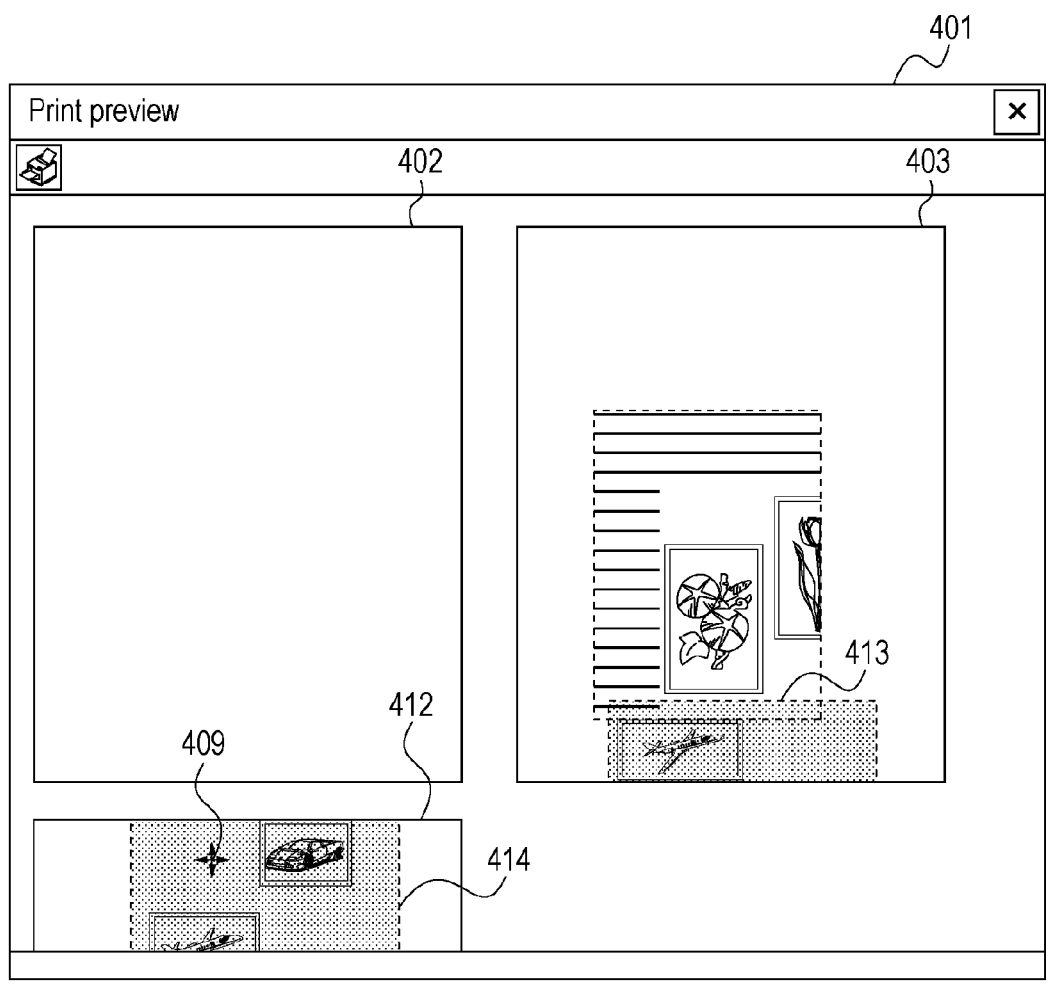
FIG. 4D is another diagram showing the print preview screen.

If the object 404 is beyond the trailing end of the page 402 by further dragging the mouse pointer 409 downward, the object 404 is divided into a first page object 410 and a second page object 411, as shown in FIG. 4C. If the mouse pointer 406 is beyond the trailing end of the page 402 by dragging the mouse pointer 406 downward, a new page 412 is created, as shown in FIG. 4D. The object 404 is divided into a first page object 413 and a second page object 414. The first page object 413 is displayed in the page 403 and the second page object 414 is displayed in the page 412.

If the mouse pointer 409 shown in FIG. 4C is beyond the trailing end of the page 402, the page where the object is arranged may not be changed from the state in FIG. 4C. If the mouse pointer 409 is beyond the trailing end of the page 402, the mouse pointer may be moved to the upper end of the page 403. In other words, the user can move the mouse pointer 409 toward the bottom of the page 403 after the operation to move the mouse pointer 409 toward the bottom of the page 402. Accordingly, since the object arranged at the upper end of the page 403 can be specified even if the mouse pointer 409 is beyond the trailing end of the page 402, the operation to move or enlarge the object can be continuously performed across the pages.

Figure 5:
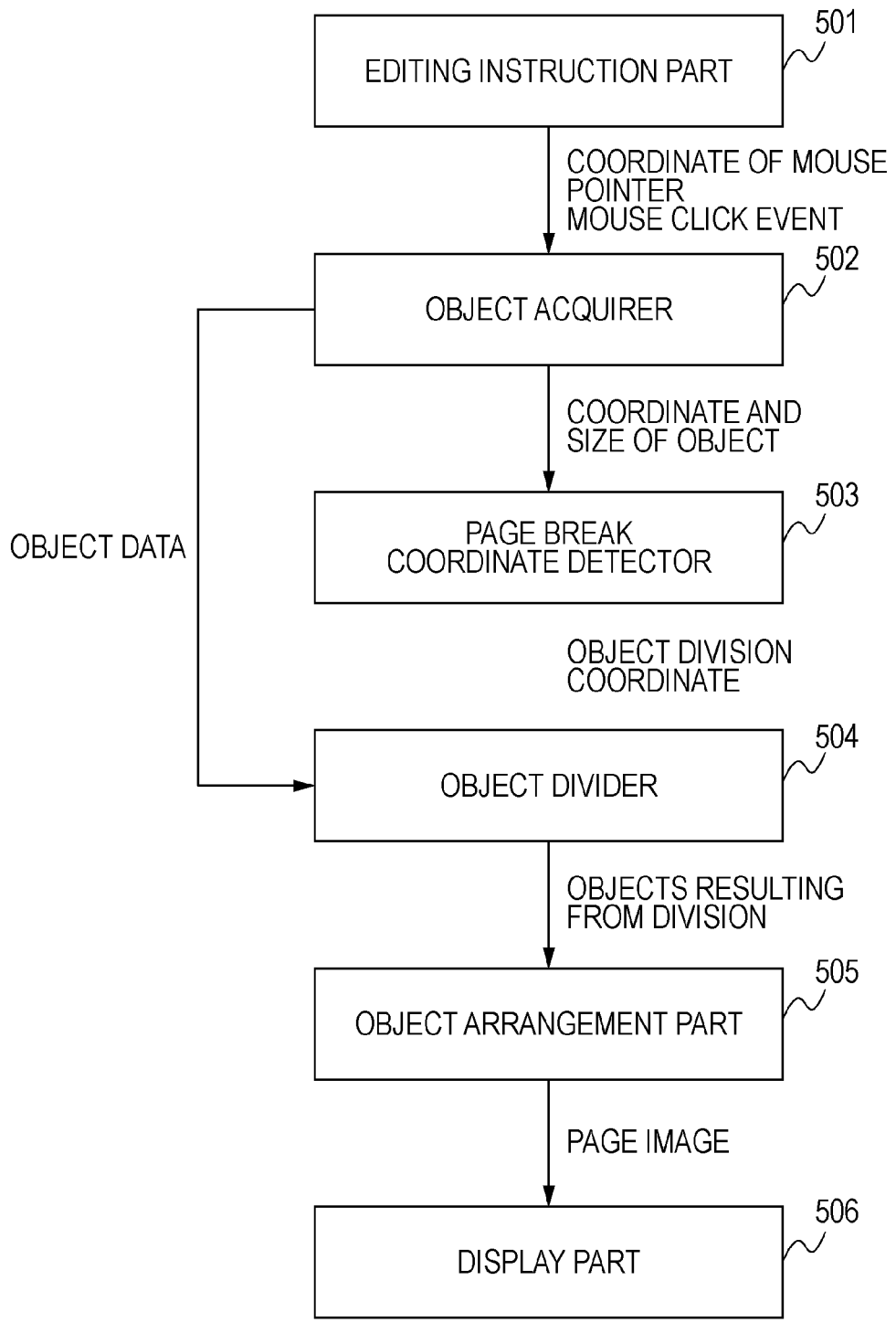
FIG. 5 is a block diagram showing the configuration of a print layout unit 206.
Figure 6:
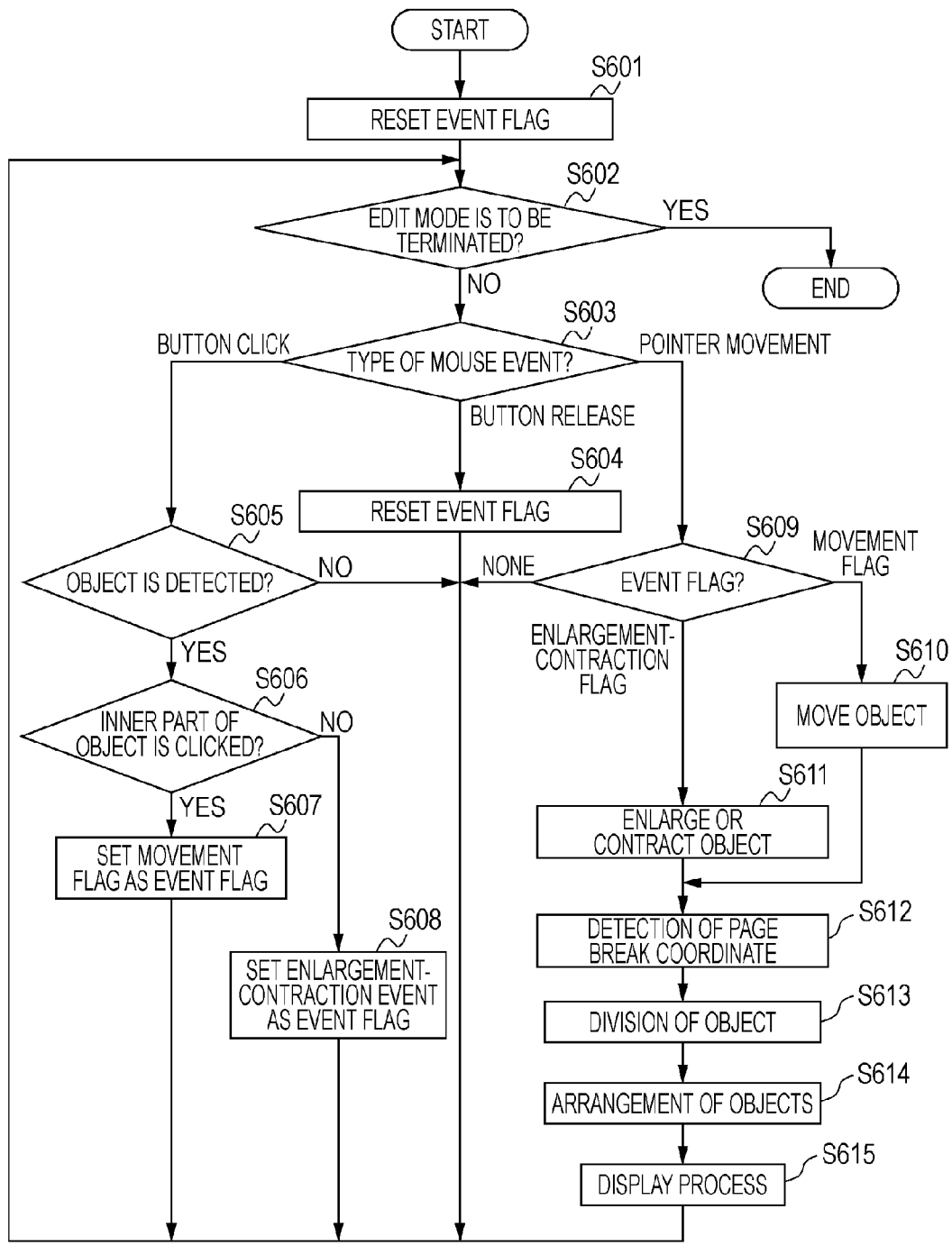
FIG. 6 is a diagram showing a procedure of an object editing process.

FIG. 5 is a block diagram showing the configuration of the print layout unit 206. FIG. 6 is a diagram showing a procedure of an object editing process. A process of moving the object shown in FIG. 4A to FIG. 4D by the print layout unit 206 will now be described with reference to the flowchart in FIG. 6.

First, an editing mode is activated when the print preview screen 401 is displayed in response to pressing of the Print preview button 304. In Step S601, an editing instruction part 501 initializes an event flag to accept an editing instruction from the user and the process enters a state of waiting for an instruction from the user. In Step S602, it is determined whether the editing mode is to be terminated by confirming whether a Print button 407 or an End button 408 is pressed. If it is confirmed that the Print button 407 or the End button 408 is pressed, the editing mode is terminated.

If a mouse event from the user, other than the pressing of the Print button 407 or the End button 408, is detected, in Step S603, the type of the mouse event is determined. The mouse event that is detected here is a button release event, a button click event, or a pointer movement event. If the button release event is detected, in Step S604, the event flag is initialized and the process enters the state of waiting for an instruction from the user because the button release event means that the editing of the object is terminated.

If the button click event is detected, in Step S605, an object acquirer 502 acquires a coordinate in the page that is clicked and determines whether an object is detected at the coordinate. If no object is detected, the process returns to the state of waiting for an instruction. If an object is detected, the object acquirer 502 acquires the object from the intermediate file storage unit 205 to store the coordinate of the object in the page and the coordinate of the mouse pointer in the page. In Step S606, the object acquirer 502 detects which part of the object is clicked. If the object is clicked at an inner part, in Step S607, a movement flag is set as the event flag. If the object is clicked on the perimeter, in Step S608, an enlargement-contraction flag is set as the event flag and, then, the process returns to the state of waiting for an instruction.

If the pointer movement event is detected in Step S603, then in Step S609, it is determined which flag is set as the event flag. If no event flag is set, the process returns to the state of waiting for an instruction because the point movement event is only a movement of the mouse pointer 406. If the movement flag is set, in Step S610, the amount of movement of the mouse is calculated from the current coordinate of the mouse pointer and the coordinate of the mouse pointer at the clicking and moves the object to a coordinate resulting from addition of the calculated amount of movement of the mouse to the coordinate of the object at the clicking. If the enlargement-contraction flag is set, in Step S611, the amount of movement of the mouse is calculated, as in the movement, and calculates the enlargement or contraction ratio of the object to enlarge or contract the object. When the movement, enlargement, or contraction of the object is performed by process in the object acquirer 502 in the above manner, the coordinate and size of the object in the page are passed to a page break coordinate detector 503 to proceed to a page break coordinate detection process. A detailed description of how to enlarge or contract the object 404 is omitted herein. When the movement, enlargement, or contraction of the object is completed, the process returns to the state of waiting for an instruction.

In Step S612, the page break coordinate detector 503 detects whether the object 404 is on a page break coordinate from the size and coordinate of the object 404 supplied from the object acquirer 502.

Figure 7:
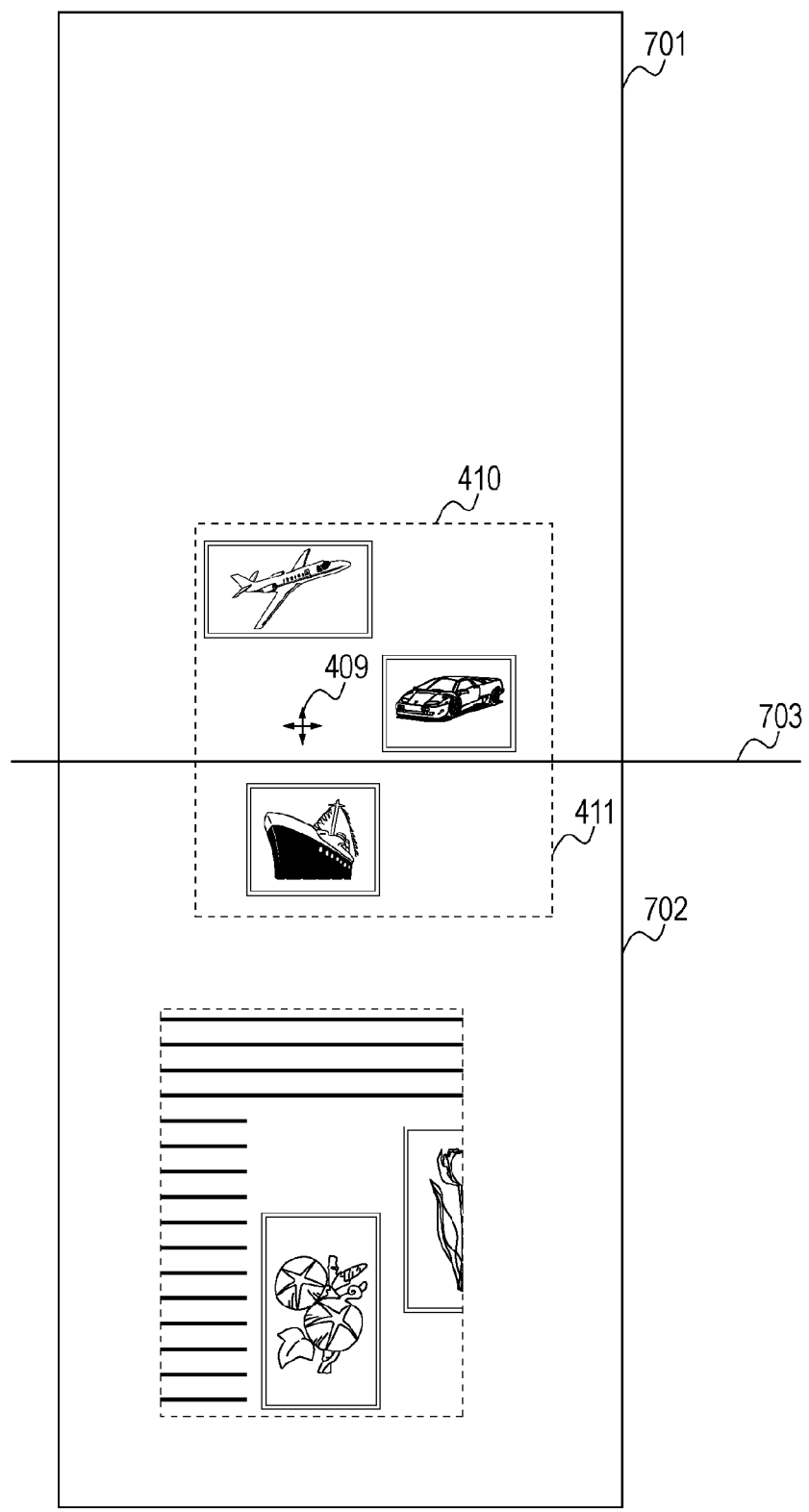
FIG. 7 is a diagram showing a page layout in a page break coordinate detector 503.

FIG. 7 is a diagram showing a page layout in the page break coordinate detector 503. In the page break coordinate detector 503, the document is processed in a layout in which pages are continuously arranged, as shown in FIG. 7. Specifically, the pages 402 and 403 are mapped to pages 701 and 702, respectively. If the object 404 is moved and is over a page break border 703, which is the boundary between the pages 701 and 702, a division coordinate of the object is calculated from the coordinate and size of the object 404 in the page and the coordinate of the page break border 703 in the page. The division coordinate indicates a coordinate at which the object 404 is divided. The division coordinate is supplied to an object divider 504.

In Step S613, the object divider 504 divides the object 404 into the first page object 410 and the second page object 411 in accordance with the acquired division coordinate of the object. The objects resulting from the division are supplied to an object arrangement part 505 along with their sizes and coordinates.

In Step S614, the object arrangement part 505 arranges the first page object 410 in the page 402 and the second page object 411 in the page 403, as shown in FIG. 4C, and supplies an image indicating the pages 701 and 702 to a display part 506. In Step S615, the display part 506 causes the print preview unit 207 to display the GUI on the print preview screen 401.

FIG. 4D illustrates how the GUI is displayed in a case in which the mouse pointer 409 shown in FIG. 4C is further moved downward from the state in FIG. 4C and is beyond the trailing end of the page 402. Although the object is divided in the same manner as in FIG. 4C by the page break coordinate detector 503 and the object divider 504, the objects resulting from the division are arranged in pages different from those in FIG. 4C. Specifically, the object arrangement part 505 arranges the first page object 413 not in the page 402 but in the page 403 and arranges the second page object 414 not in the page 403 but in the page 412 next to the page 403. Arranging the objects in the pages next to the corresponding pages in FIG. 4C results in the display of the layout in FIG. 4D.

Next, another example of the print preview screen, different from the one described above, will be described. A description of the same components as those described above is omitted herein.

Figure 9A:
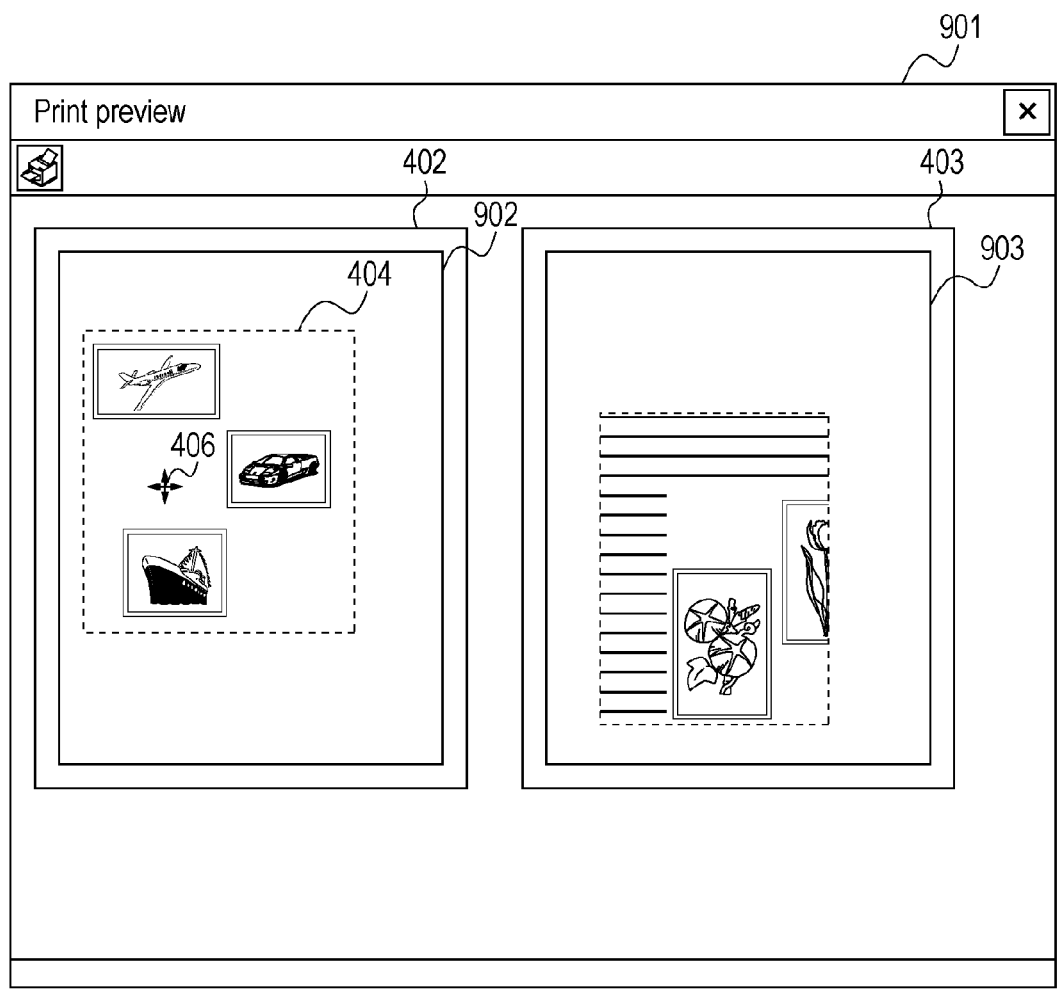
FIG. 9A is a diagram showing a print preview screen.

FIG. 9A illustrates how a GUI is displayed by the print preview unit 207. A print preview screen 901 includes printable areas 902 and 903, in addition to the pages 402 and 403 in the print preview screen 401 described above. Each printable area indicates an area in which the printing on a sheet by a printer is enabled. In other words, an area in which the printing on the entire sheet is disabled because of, for example, a sheet conveyance error in the printing by the printer and the printing is enabled inside the sheet is set as the printable area. The printable area is varied with the printer that is used and is acquired from the printer driver 210.

Lines indicating the printable areas 902 and 903 are not actually printed but are displayed also on the print preview screen 901 in order to indicate the ranges of the printable areas 902 and 903. As in the above example, a case in which the object 404 is moved downward with the mouse pointer 406 is exemplified here.

First, the editing instruction part 501 instructs editing of the object, as in the above example. The object acquirer 502 performs the process of acquiring the coordinate and size of the object in the page, as in the above example. However, when the mouse pointer 406 is positioned between the trailing end of the printable area 902 and the trailing end of the page 402, the coordinate of the mouse pointer 406 is mapped to the trailing end of the printable area 902 for the processing. Although the case in which the mouse pointer 406 is beyond the lower end of the printable area 902 is exemplified here, a similar operation is performed also in the case in which the mouse pointer 406 is beyond the upper end, the left end, or the right end of the printable area 902.

The page break coordinate detector 503 processes the pages in the same manner as that in the pages 701 and 702 shown in the above example in FIG. 7. However, the size of the pages 701 and 702 processed inside is not equal to the size of the pages 402 and 403 but is equal to the size of the printable areas 902 and 903, unlike the above example.

Figure 9B:
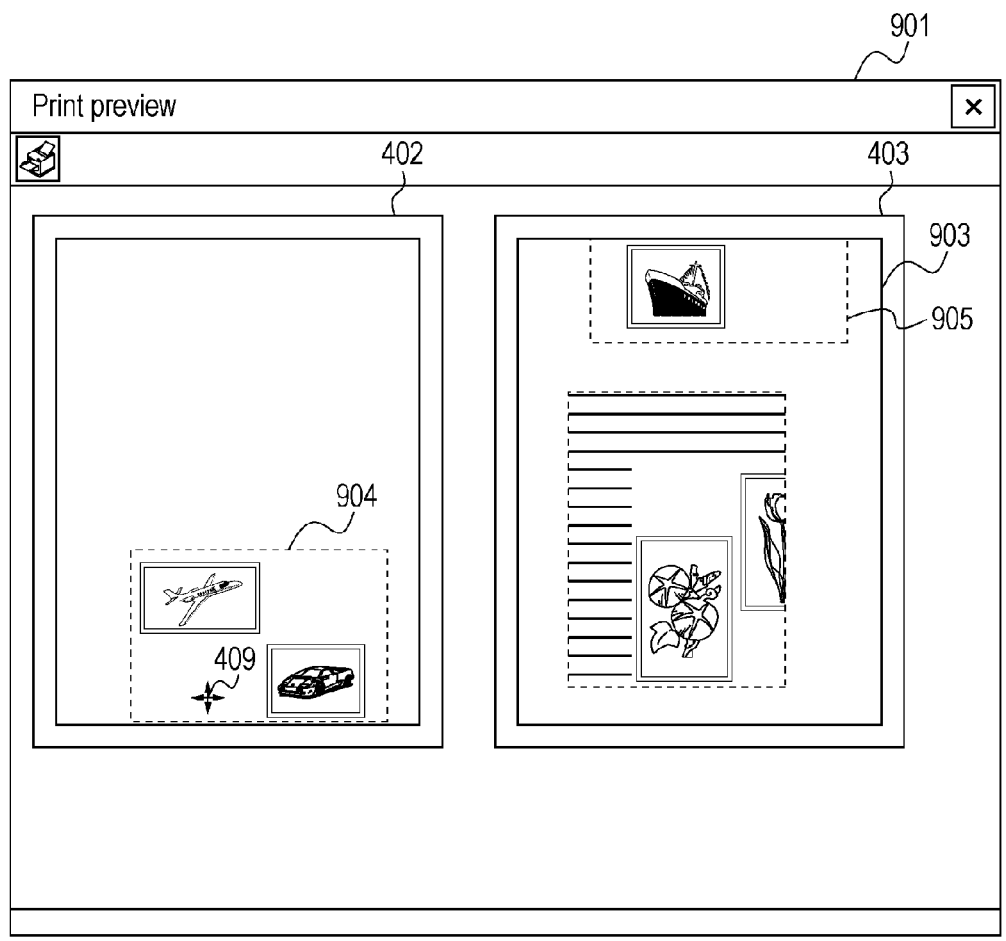
FIG. 9B is another diagram showing the print preview screen.

Then, the object divider 504 divides the object. The object arrangement part 505 arranges the objects resulting from the division. As shown in FIG. 9B, a first page object 904 is arranged in the printable area 902 and a second page object 905 is arranged in the printable area 903.

Although the case in which the printable areas are set with respect to the page size is described above, the user may arbitrarily set a margin with respect to the page size and a print preview may be displayed so as to indicate the set margin.

Performing the layout of the objects within the printable areas of the printer used in the printing in the above manner allows the objects to be freely edited on the print preview reflecting the actual result of printing.

Next, determination of the break position of an object will be described. A description of the same components as those described above is omitted herein.

Figure 10A:
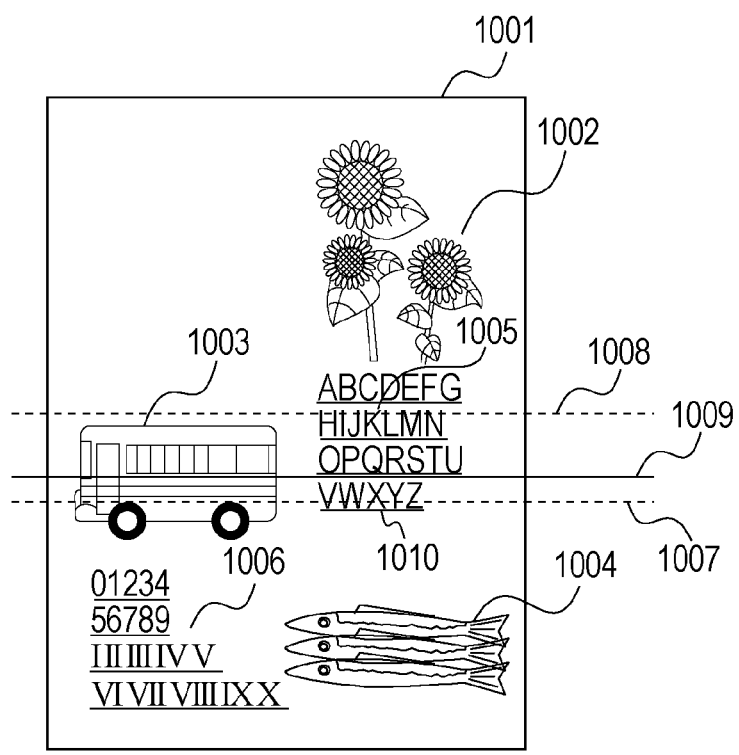
FIG. 10A is a diagram showing the relationship between objects and page breaks.
Figure 10B:
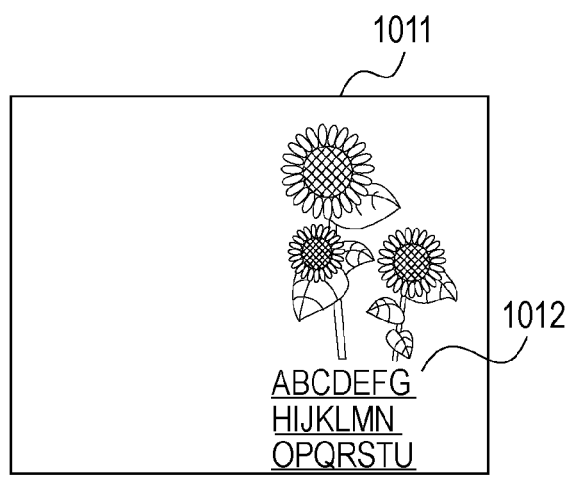
FIG. 10B is a diagram showing the relationship between objects and a page break.
Figure 10C:
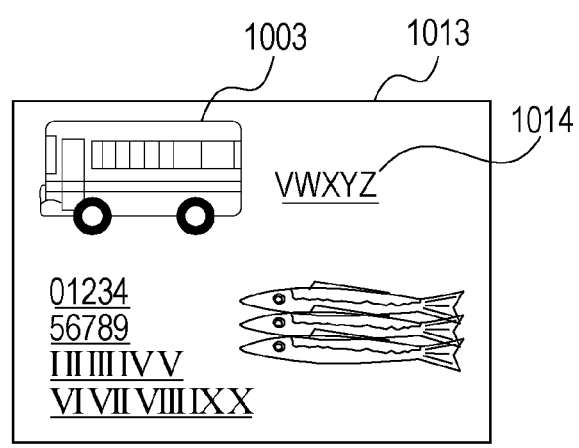
FIG. 10C is a diagram showing the relationship between objects and the page break.

FIG. 10A, FIG. 10B, and FIG. 10C are diagrams showing the relationship between objects and page breaks. An object in FIG. 10A results from the cutout of an area from a Web page displayed in the browser 201 by the document cutout unit 203 and the extraction of the area as an intermediate file in the EMF format by the intermediate file creating unit 204. Elements 1002, 1003, 1004, 1005, and 1006 (the elements 1002, 1003, and 1004 are image elements and the elements 1005 and 1006 are text elements) exist in an object 1001. The object acquirer 502 acquires the object 1001 and the page break coordinate detector 503 sets a first object division coordinate 1007 in the object 1001.

The object divider 504 first detects an element existing on the first object division coordinate 1007 in the object 1001. If the detected element is an image element (the element 1003 in FIG. 10A), it is determined whether a coordinate that does not have the corresponding element and that can be used as the division coordinate exists at the head of the element or within a certain range from the head. The coordinate is set as a second object division coordinate 1008.

It is further determined whether a text element exists on the first object division coordinate 1007. If a text element exists (a text line 1010 corresponding to the fourth line of the element 1005 in FIG. 10A), a third object division coordinate 1009 is set between the text line 1010 and the upper text line (the previous text line closer to the head) in accordance with the size of the character string.

FIG. 10B and FIG. 10C are diagrams showing a first page object 1011 and a second page object 1013, respectively, resulting from the division of the object 1001 by the object divider 504. In the division of the object 1001, the image element 1003 existing on the first object division coordinate 1007 is entirely arranged in the second page object 1013 and is not displayed in the first page object 1011. The text lines after the text line 1010 in the text element 1005 existing on the first object division coordinate 1007 are arranged in the second page object 1013 as an element 1014. The text lines before the text line 1010 in the text element 1005 are arranged in the first page object 1011 as an element 1012. Whether the image element 1003 is arranged in the first page object 1011 or in the second page object 1013 may be determined on the basis of the relative position between the object division coordinate 1009 and the image element 1003 or the image element 1003 may be arranged at either side.

Figure 11:
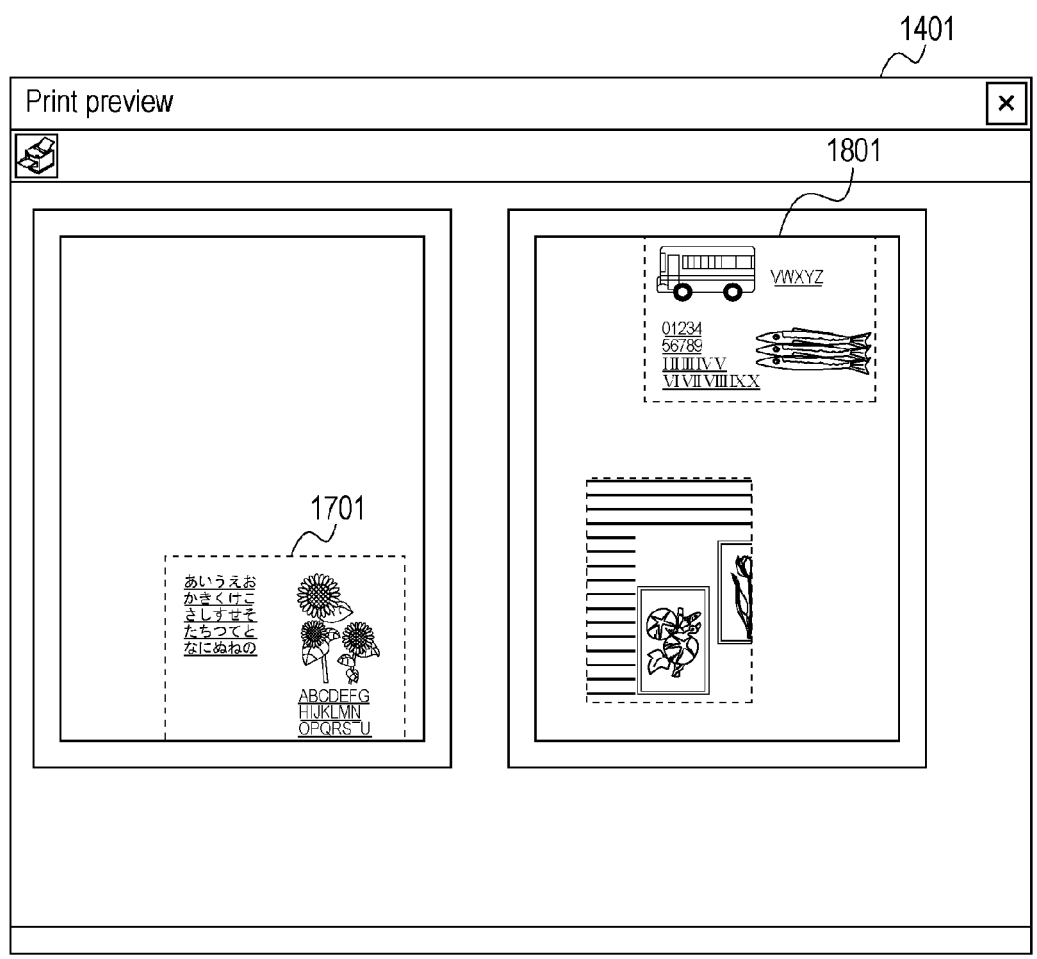
FIG. 11 is a diagram showing a print preview screen.

FIG. 11 is a diagram showing a print preview screen. As shown in FIG. 11, the object 1001 is divided into a first page object 1701 and a second page object 1801 that are arranged. The coordinate on which the object is divided is shifted from the first object division coordinate 1007 at which the object 1001 is to be divided to a position where the coordinate is not overlapped with the characters in the text element. If the coordinate is overlapped with an image element at the position resulting from the shift, the image element is included in the object in any page. Accordingly, even when the page break coordinate is overlapped with an element in the object, the entire image element or part of the lines in the text element can be fed to the next page. As a result, it is possible to perform the page break at a desired position for the user.

As described above, according to the present embodiment, it is possible to divide an object to perform the appropriate layout of the objects on pages. In addition, even in the page layout in which multiple pages are not continuously displayed, the object can be edited across the pages. Furthermore, since the object is divided at the break position between pages and the layout of the objects resulting from the division is performed, the layout of each page of the objects resulting from the division can be performed in the same manner as in the normal object. In this case, if the object is changed to an object corresponding to the break position between pages in response to an instruction from the user, the object division coordinate may be updated to divide the object on the updated division coordinate.

The page breaks corresponding to the upper end and the lower end of a page on a displayed screen are described in the above embodiments. However, the object may be divided on the basis of the page break corresponding to the left end or the right end of the page on the displayed screen. In other words, it is possible for the user to divide the object between two pages that are horizontally adjacent to each other on the displayed screen by moving or enlarging the object leftward or rightward on the displayed screen.

Figure 8A:
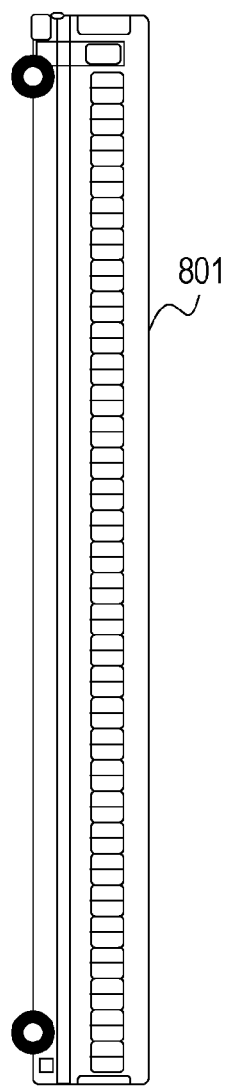
FIG. 8A is a diagram showing an object 801.
Figure 8B:
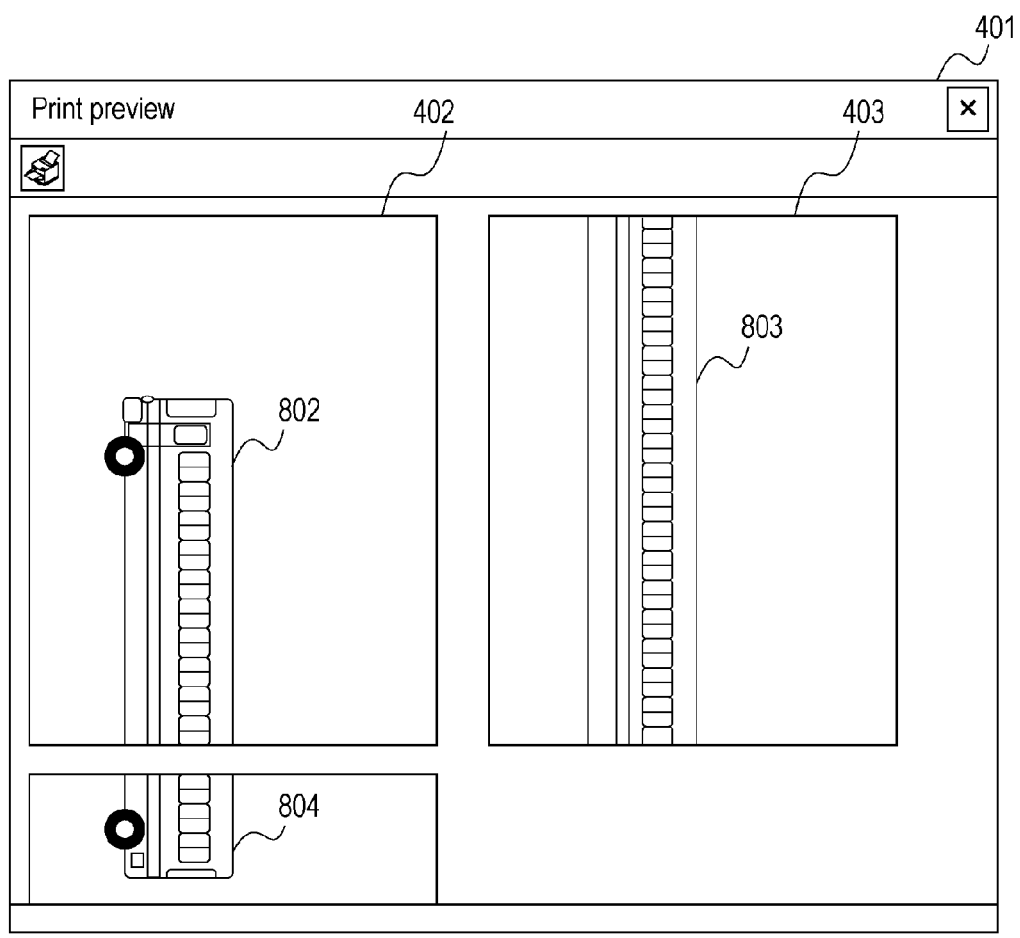
FIG. 8B is a diagram showing a print preview screen in which the object is divided among three pages.

Although the example in which the object 404 is across two pages is described above, the present invention is not limited to this example and the object 404 may be across three or more pages. FIG. 8A is a diagram showing an object 801. FIG. 8B is a diagram showing a print preview screen in which the object is divided among three pages. The vertically long object 801 in FIG. 8A is across two or more pages, as shown in FIG. 8B. In this case, objects 802, 803, and 804 resulting from the division of the object 801 may be displayed in the respective pages to be edited.

Furthermore, an object may be arranged across three or more pages to be divided among the three or more pages for the layout.

The present invention may be embodied by supplying a recording medium in which the program code of software realizing the functions of the above embodiments is recorded to a system or an apparatus. In this case, the object of the present invention is achieved by the computer (or a CPU or a micro processor unit (MPU)) in the system or apparatus, which reads out the program code stored in the recording medium to execute the readout program code. The program code itself read out from the storage medium realizes the functions of the above embodiments. The present invention is embodied by the program code itself or the storage medium storing the program code.

The present invention is not limited to the computer that executes the readout program code to realize the functions of the above embodiments. For example, the OS or the like running on the computer may perform part or all of the actual processing in response to the instructions in the program code to realize the functions of the above embodiments. Furthermore, the present invention may be realized by multiple processors including the CPU and the MPU that cooperate with each other to execute the processing.

According to the present invention, it is possible to appropriately arrange elements in a document to output an image corresponding to the document having the elements appropriately arranged therein.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

REFERENCE SIGNS LIST

101 PC
102 CPU
103 RAM
104 ROM
105 hard disk
106 USB interface
107 display device
108 mouse
109 keyboard
110 communication interface
111 system bus

The invention claimed is:

1. An apparatus comprising:
a processing unit configured to execute moving of an object including a plurality of elements or changing a size of the object in one or more pages a in which the object is arranged in response to an instruction from a user;
an acquiring unit configured to acquire information indicating the position in the one or more pages, of the elements included in the object which the moving or the changing of the size is executed in the one or more pages by the processing unit;
a detecting unit configured to, if in a case where the object straddles a boundary between two pages because of the moving or the changing of the size, detect at least one element that is included in the object and that corresponds to of the boundary between the two pages on the basis of the information acquired by the acquiring unit;
a determining unit configured to determine a position in the object where the object is divided by the two pages, so that the object is divided at the boundary in a case where the detecting unit does not detect the at least one element, and so that the object is divided by arranging a part of or the entirety of a first element to one of the two pages and by arranging a second element included in the object to another page, in a case where the detecting unit detects the first element; and
an output unit configured to output an image corresponding to the two pages in which the object is divided by the two pages at the position determined by the determining unit.

2. The apparatus according to claim 1, wherein the object includes an element defined in a structured document.

3. The apparatus according to claim 2, wherein the object corresponds to an area specified by the user in a Web page displayed by a Web browser on the basis of the structured document.

4. The apparatus according to claim 2, further comprising:
a generating unit configured to generate an intermediate file of the element defined in the structured document in a vector format, wherein the determining unit determines a position in the document of the element included in the intermediate file generated by the generating unit.

5. The apparatus according to claim 1, wherein the output unit outputs the image to a printing apparatus to cause the printing apparatus to print out the image.

6. The apparatus according to claim 1, wherein the output unit outputs the image to a display apparatus to cause the display apparatus to display the image.

7. The apparatus according to claim 1, wherein the acquiring unit acquires first information indicating the position of the object which the moving or the changing is executed in the document and second information indicating the position corresponding to the boundary between the two pages in the object, and the detecting unit detects the element corresponding to the boundary between of the two pages on the basis of the first information and the second information acquired by the acquiring unit.

8. A method comprising: execute moving of an object including a plurality of elements or changing a size of the objection in one or more pages a document in which the object is arranged in response to an instruction from a user;
acquiring information indicating the position: in the one or more pages, of the elements included in the object which the moving or the changing of the size is executed in moved on the one or more pages;
detecting, if in a case where the object straddles is moved to a boundary between two pages because of the moving or the changing of the size, of at least one element that is included in the object and that corresponds to the boundary between the two pages on the basis of the acquired information;
determining a position in the object where the object is divided by the two pages, so that the object is divided at the boundary in a case where the detecting does not detect the at least one element, and so that the object is divided by arranging a part of or the entirety of a first element to one of the two pages and by arranging a second element included in the object to another page, in a case where the detecting detects the first element the at least one detected element is arranged in the document so that the detected element is arranged either entirely in one of the two pages or entirely in the other of the two pages; and
outputting an image corresponding to the two pages in which the object is divided by the two pages the detected element is arranged at the determined position.

9. A non-transitory computer-readable storage medium storing a program that causes a computer to perform the method according to claim 8.

10. The method according to claim 8, wherein the object includes an element defined in a structured document.

11. The method according to claim 10, wherein the object corresponds to an area specified by the user in a Web page displayed by a Web browser on the basis of the structured document.

12. The method according to claim 10, further comprising:
generating an intermediate file of the element defined in the structured document in a vector format, wherein the determining determines a position in the document of the element included in the intermediate file generated by the generating.

13. The method according to claim 8, wherein the outputting outputs the image to a printing apparatus to cause the printing apparatus to print out the image.

14. The method according to claim 8, wherein the outputting outputs the image to a display apparatus to cause the display apparatus to display the image.

15. The method according to claim 8, wherein the acquiring acquires first information indicating the position of the object which the moving or the changing is executed in the document and second information indicating the position corresponding to the boundary between the two pages in the object, and the detecting detects the element corresponding to boundary between the two pages on the basis of the first information and the second information acquired by the acquiring.

16. The apparatus according to claim 1, wherein the determining unit determines whether the entire first element is arranged to one of the two pages or whether the first element is divided by the two pages, based on a type of the first element.

17. The apparatus according to claim 16, wherein the determining unit determines that the first element is arranged either entirely in one of the two pages in a case where the first element is an image element, and determines that the first element is divided by the two pages in a case where the first element is a text element.

18. The apparatus according to claim 16, wherein the determining unit determines, individually for each of two elements, whether to arrange the entire element to one of the two pages or divide to the two pages, in a case where the detecting unit detects the two elements.

19. The method according to claim 8, wherein the determining determines whether the entire first element is arranged to one of the two pages or whether the first element is divided by the two pages, based on a type of the first element.

20. The method according to claim 19, wherein the determining determines that the first element is arranged either entirely in one of the two pages in a case where the first element is an image element, and determines that the first element is divided by the two pages in a case where the first element is a text element.

21. The method according to claim 19, wherein the determining determines, individually for each of two elements, whether to arrange the entire element to one of the two pages or divide to the two pages, in a case where the detecting unit detects the two elements.

* * * * *